United States Patent [19]

Gagen et al.

[11] 4,241,979

[45] Dec. 30, 1980

[54] OPTICAL COMMUNICATION CABLE WITH MEANS FOR CONTROLLING COUPLING BETWEEN CABLE JACKET AND STRENGTH MEMBERS

[75] Inventors: Paul F. Gagen, Duluth; Manuel R. Santana, Doraville, both of Ga.

[73] Assignee: Bell Telephone Laboratories, Incorporated, Murray Hill, N.J.

[21] Appl. No.: 4,342

[22] Filed: Jan. 18, 1979

[51] Int. Cl.³ ................................................ G02B 5/16
[52] U.S. Cl. .................................................. 350/96.23
[58] Field of Search ...................................... 350/96.23

[56] References Cited

U.S. PATENT DOCUMENTS

| 4,076,382 | 2/1978 | Oestreich | 350/96.23 |
| 4,078,853 | 3/1978 | Kempf et al. | 350/96.23 |
| 4,082,423 | 4/1978 | Glista et al. | 350/96.23 |
| 4,129,468 | 12/1978 | Knab | 350/96.23 X |
| 4,169,657 | 10/1979 | Bedard | 350/96.23 |

FOREIGN PATENT DOCUMENTS

| 2556861 | 7/1976 | Fed. Rep. of Germany | 350/96.23 |
| 2513722 | 9/1976 | Fed. Rep. of Germany | 350/96.23 |
| 2628069 | 8/1977 | Fed. Rep. of Germany | 350/96.23 |
| 2628070 | 8/1977 | Fed. Rep. of Germany | 350/96.23 |
| 2265108 | 10/1975 | France | 350/96.23 |
| 2296192 | 7/1976 | France | 350/96.23 |

*Primary Examiner*—John K. Corbin
*Assistant Examiner*—John D. Lee
*Attorney, Agent, or Firm*—Sylvia J. Chin

[57] ABSTRACT

An improved optical cable (10) having increased bending flexibilitiy along with increased tensile strength comprises means for controlling coupling between a cable jacket (28) and its reinforcing strength members (26). In one embodiment, a reinforcement bedding layer (23) is applied between a plastic-extruded inner jacket (22) and the outer cable jacket (28). Before extrusion of the outer jacket (28), the reinforcing strength members (26) are helically applied onto the bedding layer with predetermined strength member surfaces (27) making intimate surface contact with the bedding layer. Because the bedding layer is impervious to the plastic extrudant used to construct the outer jacket and is capable of rendering the predetermined strength member surfaces sufficiently inaccessible to the plastic extrudant, encapsulation of strength member lengths (25) containing the predetermined strength member surfaces (27) by the plastic extrudant is prevented.

In another embodiment, the cable sheath (57) includes two separate layers (64, 70) of strength members, each layer having predetermined lays in opposite directions such that under a tensile load they produce equal but oppositely directed torques about the cable's longitudinal axis. The coupling between each layer of strength members and its surrounding jacket can also be controlled.

18 Claims, 3 Drawing Figures

4,241,979

OPTICAL COMMUNICATION CABLE WITH MEANS FOR CONTROLLING COUPLING BETWEEN CABLE JACKET AND STRENGTH MEMBERS

TECHNICAL FIELD

This invention relates to cables comprising light-transmitting optical fibers and more particularly, to optical communication cables having improved sheath structures.

BACKGROUND OF THE INVENTION

While desired for their large bandwidth capabilities and small size, light-transmitting optical fibers are mechanically fragile, exhibiting low-strain fracture under tensile loading and degraded light transmission when bent. As a result, cable structures have been developed to mechanically protect the fibers, hence rendering fibers a realizable transmission medium.

A potential application for an optical cable is in ducts where space may be scarce. Such a cable must be capable of withstanding tensile loads applied when being pulled into a duct and bending stresses due to bends and turns in the ducts and manholes. One cable particularly suited for such an application is described in U.S. Pat. No. 4,078,853, issued to Kempf et al on Mar. 14, 1978.

In one embodiment, the Kempf et al cable comprises a core of optical ribbons surrounded by a loose-fitting plastic-extruded inner tubular jacket; a thick, compliant insulative layer of polypropylene twine; and a plastic-extruded outer jacket reinforced with primary strength members. In the Kempf et al cable, the strength members are embedded and encapsulated in the outer jacket to achieve tight coupling with the outer jacket. During cable manufacture, the insulative layer of polypropylene twine, onto which the strength members are wrapped prior to outer-jacket extrusion, retreats from the strength members under the pressure of the outer-jacket plastic extrudant, thus allowing encapsulation of the strength members by the outer jacket.

The Kempf et al cable has sufficient tensile strength to reliably protect the core of optical fibers under tensile loading and sufficient bending flexibility to ease cable handling prior to, during, and following duct installation. However, in certain situations, greater tensile loads are expected, especially where ducts are extremely congested, and/or when ducts have been found to have more bends than previously expected. In the Kempf et al cable, bending flexibility decreases when more strength members are added to the outer jacket for increased tensile strength. However, greater bending flexibility is desired at the same time as higher tensile strength to ease cable handling and installation.

Therefore, there is a need to design an improved optical communication cable which is capable of greater bending flexibility and greater tensile strength at the same time.

Desirably, such a cable is also designed to perform reliably under sustained tensile loads.

SUMMARY OF THE INVENTION

One objective of this invention is to develop an optical communication cable which has high tensile strength and which is relatively flexible. A second objective is that the bending flexibility can be varied substantially independent of the amount of tensile reinforcement added. A third objective of this invention is a cable which is reliable in performing under sustained tensile loads.

Pursuant to the above objectives and others, an optical communication cable has been developed in which the coupling between the strength members and the outer jacket is precisely controlled. In the illustrative embodiment, a reinforcement bedding layer of material, about which the strength members are helically wrapped, is added between the plastic-extruded inner and outer jackets to control the extent to which the strength members are encapsulated by the plastic extrudant of the outer jacket.

The bedding layer, which is substantially impervious to penetration by the plastic extrudant, interfaces with the strength members to define predetermined strength member surfaces inaccessible to the plastic extrudant during outer jacket extrusion. By preventing encapsulation of predetermined lengths of the strength members, the strength members are still tightly coupled to the outer jacket under a tensile load, but are capable of more readily sliding with respect to the outer jacket under local bending where no encapsulation occurs. Under tensile loading, the sliding is substantially eliminated because sufficient shear and frictional coupling exists between the outer jacket and the strength members.

In one of the illustrative embodiments, the inventive cable features two such reinforcement bedding layers and two separate layers of strength members. In accordance with another aspect of this invention, the two layers of strength members are helically wrapped with predetermined lays in opposite directions. Under a tensile load these two layers of strength members produce equal but oppositely directed torques about the longitudinal axis of the cable. This ensures the absence of torsional creep under sustained tensile loads.

The invention and its further objectives, features, and advantages will be readily apparent from a reading of the description to follow of illustrative embodiments.

DETAILED DESCRIPTION OF ILLUSTRATIVE EMBODIMENTS

Figure 1:
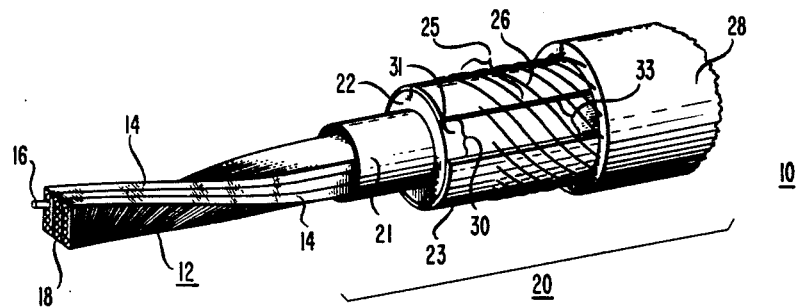
FIG. 1 is a fragmented perspective view of an optical communication cable constructed in accordance with this invention.

Shown in FIG. 1 is a fragmented perspective view of one embodiment 10 of the optical communication cable constructed in accordance with this invention. The cable 10 comprises a core 12 of optical ribbons 14, with each ribbon 14 comprising a plurality of light-transmitting optical fibers 16 contained in a mechanically protective medium 18. Surrounding the core 12 is a cable sheath 20 which comprises a heat barrier layer 21 made of an insulative material such as a synthetic resin polymer tape, a plastic-extruded inner tubular jacket 22 which forms with the heat barrier layer 21 a loose tube for loosely containing the core 12, a reinforcement bedding layer 23, a layer or group of reinforcing strength members 26, and a plastic-extruded outer jacket 28.

In the FIG. 1 cable 10, both jackets 22 and 28 are made of polyethylene though other plastics can be used, even a different plastic for each jacket. The strength members 26 are steel wires in the FIG. 1 cable. However, it is apparent that other materials, metallic and nonmetallic, can be used for the strength members.

In accordance with this invention, the bedding layer 23 controls coupling between the strength members 26 and the outer jacket 28. The bedding layer 23 intimately interfaces with the strength members 26 to render predetermined surfaces 27 (FIG. 2) of the strength members 26 sufficiently inaccessible for coupling with the plastic extrudant used to construct the outer jacket 28, hence preventing wire encapsulation for the strength member lengths 25 containing the predetermined surfaces 27.

During cable manufacture, the steel wires 26 are first helically wrapped onto the bedding layer 23 under tension so that the predetermined wire surfaces 27 make intimate surface contact with the bedding layer 23. Then, the outer jacket 28 is pressure extruded onto the bedding layer 23 and steel wires 26. The bedding layer 23 is sufficiently stiff to sufficiently hinder the flow of the outer-jacket plastic extrudant to the predetermined wire surfaces 27 so that encapsulation of those lengths 25 of wires 26 is prevented. This reduces jacket-wire coupling sufficiently so that the wires 26 can more readily slide with respect to the outer jacket 28, where the bedding layer 23 is present, during local cable bending.

Preventing encapsulation has a minimum effect on the reinforcing tensile strength of the steel wires 26. When the plastic-extruded outer jacket 28 cools during cable manufacture, it forms a tight mechanical interference fit about the steel wires 26. Hence, during tensile loading of the cable, sufficient wire-jacket shear coupling exists to ensure tight longitudinal coupling between the steel wires 26 and jacket 28.

In the FIG. 1 cable, the bedding layer 23 is advantageously made of a thin layer, say 0.020–0.025 cm, of spunbonded polyester. The particular spunbonded polyester used is a standard product of E. I. DuPont de Nemours and Company. Spunbonded polyester is sufficiently compliant to develop trough-like recesses 24 (FIG. 2), which increase surface contact with the steel wires 26 having circular cross sections. In the illustrative embodiment, the wires 26 have a 0.043 cm diameter while the bedding layer 23 has a thickness of 0.023 cm. Advantageously, the trough-like recesses 24 also aid to maintain accurate registration of the steel wires 26 in prescribed regular intervals in the sheath 20. The relatively high-friction surface of the spunbonded polyester also promotes registration.

The spunbonded polyester 23 is sufficiently compliant and thick enough to enhance registration of the strength members, but sufficiently stiff and thin enough to utilize the rigidity of the inner jacket 22 to prevent the outer-jacket plastic extrudant from penetrating the predetermined wire surfaces to encapsulate the wires 26. The bedding layer 23 also supports the wires 26 sufficiently to minimize their inward radial movement, which movement can increase the tendency of a cable sheath to buckle. At the same time, it is sufficiently thin so as to not add significantly to the diameter of the cable or the radial compliance of the cable which can result in tensile creep.

It is apparent that the bedding layer 23 can be made of other materials having varying thicknesses and stiffnesses. A thicker and stiffer material can be used. Also, if the strength members are flat, a material with a high-friction surface, but with little compliance, can be used. The bedding layer can also be of multi-ply construction with an outer layer which is relatively compliant and/or surface-roughened to register the strength members and with a rigid and stiff bottom layer which helps to substantially prevent access to the predetermined wire surfaces 27 by the plastic extrudant. It is critical that the bedding layer be capable of preventing strength member encapsulation by the outer jacket 28.

It should also be pointed out that the strength members can be a material other than steel. For example, nonmetallic strength members, such as graphite or aramid rods can be used. It is also apparent that the strength members can be composite structures comprising any of a number of high modulus materials.

Figure 2:
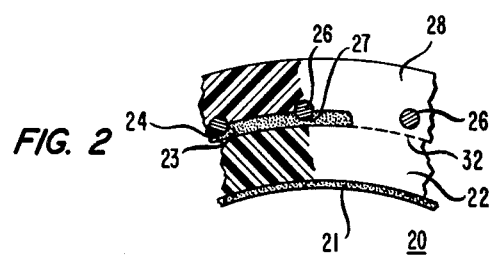
FIG. 2 depicts a partial cross section of the FIG. 1 cable sheath showing the effect the reinforcement bedding layer has on encapsulation of the reinforcing steel wires by the plastic-extruded outer jacket.

In the FIG. 1 cable, the bedding layer 23 is longitudinally applied and does not completely wrap about inner jacket 22 to define a gap or a strength member encapsulating region 30, where encapsulation of the steel wires 26 does occur. Advantageously, the bedding layer 23 suspends the strength members 26 over the inner jacket 22 in the strength member encapsulating region 30 to promote effective encapsulation by the outer-jacket plastic extrudant. Also, during extrusion of the outer jacket, the heat and pressure of the outer-jacket plastic extrudant cause the inner-jacket plastic extrudant along the exposed surface 31 of the inner jacket 22 to melt. Hence, the inner jacket 22 integrally fuses with the outer jacket 28 to form the unitary structure to help ensure encapsulation of the strength members 26. In FIG. 2, an imaginary dotted line 32 denotes the fused interface between the inner and outer jackets 22 and 28.

By adjusting the bedding layer width, the size of the gap 30 can be varied to attain the desired strength member encapsulation and thus the desired bending flexibility.

Lengths 25 of the strength members 26 abutting the bedding layer 23 are not encapsulated while the lengths 33 of the strength members 26 in the gap 30 are encapsulated. Where the steel wires 26 are encapsulated by the outer-jacket plastic extrudent, the jacket 28 forms a shrink fit, like a closed ring, which substantially mitigates relative movement of the strength members 26 with respect to the jacket 28. Where the strength members 26 are seated onto the bedding layer, the outer jacket 28 forms a split-type ring, which more easily allows relative movement of the strength members 26 with respect to the outer jacket 28 under local bending.

It is apparent that the bedding layer 23 can be applied to form no gaps so that entire lengths of the steel wires 26 are not encapsulated, in which case the cable 10 will have its greatest bending flexibility.

Figure 3:
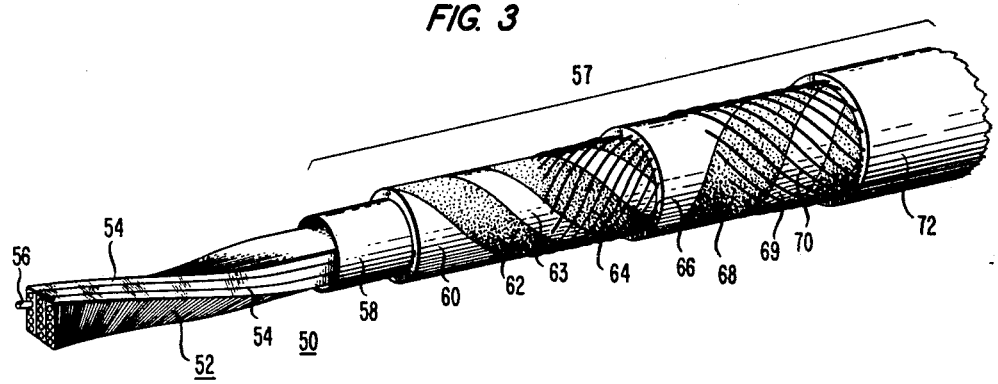
FIG. 3 shows in fragmented perspective view another embodiment of the inventive optical communication cable featuring two layers of strength members and two reinforcement bedding layers.

FIG. 3 shows an alternative embodiment 50 of this invention. Similar to the FIG. 1 cable, the FIG. 3 cable 50 comprises a core 52 of optical ribbons 54 containing optical fibers 56. However, the cable 50 comprises a cable sheath 57 with a layer of insulative material 58, a plastic-extruded inner tubular jacket 60, a first reinforcement bedding layer 62, a first layer 64 of strength members, a plastic-extruded first outer jacket 66, a second reinforcement bedding layer 68, a second layer 70 of strength members, and a plastic-extruded second outer jacket 72.

In the FIG. 3 cable, the bedding layers 62 and 68 are helically applied in opposite directions to form candy-striped gaps or strength member encapsulating regions 63 and 69. In this embodiment, the lay length of the bedding layers, as well as their width, can be varied to obtain the desired amount of strength member encapsulating regions. It is apparent that either bedding layer 62 or 68 can be applied continuously to form a reinforcement bedding layer without a strength member encapsulating region.

Advantageously, the FIG. 3 cable is a torque-balanced cable. The two layers 64, 70 of strength members are helically wrapped in opposite lay directions with predetermined lays so that under a tensile load the two layers produce equal but oppositely directed torques about the longitudinal axis of the cable. This advantageously eliminates torsional creep or twisting that can otherwise occur when the cable is under sustained tensile loads. In the illustrative embodiment, each layer 64, 70 is also wrapped in a lay direction opposite to its bedding layer 62, 68 to ensure periodic encapsulation of each strength member.

Another torque-balanced cable can be constructed which is more similar to the FIG. 1 cable. In this further embodiment, a layer of second strength members is helically applied with an opposite lay direction directly onto a layer of first strength members (similar to members 26). Such a cable has a sheath identical to the FIG. 1 cable but for the second strength members, which are substantially encapsulated in the outer jacket.

While certain illustrative embodiments of the invention have been shown and described, it should be apparent that modifications can be made without departing from the scope of the invention.

I claim:

1. An optical communication cable (10) comprising:
   a core (12) comprising at least one light-transmitting optical fiber (14);
   an inner jacket (22) surrounding the core;
   a plurality of helically applied reinforcing strength members (26); and
   an outer jacket (28) constructed of plastic extrudant, the outer jacket surrounding the inner jacket and coupled with the strength members; the cable being characterized by:
   a reinforcement bedding layer (23) made of a material which is capable of registering the strength members as they are helically wrapped about the bedding layer to hold the strength members in regular intervals around the cable and which is substantially impervious to plastic extrudant and intimately interfaces with the strength members to form predetermined strength member surfaces (27) inaccessible to the outer-jacket plastic extrudant during cable manufacture, whereupon helical wrapping of the strength members onto the bedding layer during cable manufacture, the bedding layer registers the strength members and renders the predetermined strength member surfaces sufficiently inaccessible to the outer-jacket plastic extrudant to prevent strength member encapsulation by plastic extrudant of the strength member lengths containing the predetermined strength member surfaces.

2. The cable (10) pursuant to claim 1 where the bedding layer (23) is made of a material which is sufficiently compliant to form trough-like recesses (24) to register and hold the strength members (26) in regular intervals around the cable and which is capable of sufficiently hindering flow of the plastic extrudant to the predetermined strength member surfaces (27) to prevent strength member encapsulation.

3. The cable (10) pursuant to claim 1 where the bedding layer (23) is discontinuously applied over the inner jacket (22) to form at least one gap (30) which defines a strength-member encapsulating region (30).

4. The cable (10) pursuant to claim 3 where each of the strength members (26) is periodically encapsulated by the plastic extrudant.

5. The cable (10) pursuant to claim 4 where the outer jacket (28) is made of pressure-extruded polyethylene.

6. The cable (50) pursuant to claim 3 where the bedding layer (62) is applied in a candy-stripe fashion over the inner jacket (60).

7. The cable (50) pursuant to claim 6 where the strength members (64, 70) are helically wrapped onto the bedding layer (62, 68 respectively) in a lay direction opposite to the direction with which the bedding layer is applied.

8. The cable (10) pursuant to claim 3 where the bedding layer (23) is applied longitudinally over the inner jacket (22) and the gap (30) is longitudinally continuous.

9. The cable (10) pursuant to claim 1 where the bedding layer (23) is made of spunbonded polyester.

10. The cable (10) pursuant to claim 9 where the bedding layer (23) is sufficiently thin to utilize the rigidity of the inner jacket (22) to help hinder flow of the plastic extrudant to the predetermined strength member surfaces (27) to prevent strength member encapsulation.

11. The cable (10) pursuant to claim 1 where the strength members (26) are rods.

12. The cable (10) pursuant to claim 11 where the strength members (26) are metallic.

13. The cable (10) pursuant to claim 1 where the strength members (26) are nonmetallic structures.

14. An optical communication cable (50) having a longitudinal axis comprising:
   a core (52) comprising at least one light transmitting optical fiber (56);
   an inner tubular jacket (60) for loosely containing the core;
   a first reinforcement bedding layer (62);
   a first layer (64) of reinforcing strength members helically wrapped about the first reinforcement bedding layer to form an intimate surface interface;
   a first outer jacket (66) made of plastic extrudant and coupled with the first layer of strength members;
   a second reinforcement bedding layer (68);
   a second layer (70) of reinforcing strength members helically wrapped about the second reinforcement bedding layer to form an intimate surface interface;
   a second outer jacket (72) made of plastic extrudant and coupled with the second layer of strength members;
   where the first and second layers of strength members are helically wrapped in opposite directions with predetermined lays such that under a tensile load each layer produces a substantially equal but oppositely directed torque with respect to the axis of the cable;
   and where the bedding layers are each made of a material which is capable of registering the strength members as they are helically wrapped about the bedding layers to hold the strength members in regular intervals around the cable and which is substantially impervious to plastic extrudant and intimately interfaces with the strength members to form predetermined strength member surfaces (27) inaccessible to the outer-jacket plastic extrudant during cable manufacture, whereupon helically wrapping of each layer of strength members onto its associated bedding layer during cable manufacture, the associated bedding layer registers the associated strength members and renders their predetermined strength member surfaces sufficiently inaccessible to the outer-jacket plastic extrudant to prevent strength member encapsulation by plastic extrudant of the strength member lengths containing the predetermined strength member surfaces.

15. The cable (50) pursuant to claim 14 where the first reinforcement bedding layer (62) completely encompasses the inner tubular jacket (60); and where the second reinforcement bedding layer (68) is applied discontinuously over the first outer jacket (66).

16. The cable (50) pursuant to claim 14 where the first reinforcement bedding layer (62) and the second reinforcement bedding layer (68) are applied discontinuously over the inner tubular jacket (60) and the first outer jacket (66) respectively, to form gaps which define strength member encapsulating regions (63, 69 respectively).

17. The cable (50) pursuant to claim 14 where one reinforcement bedding layer (62 or 68) is applied to completely encompass its inner neighboring layer (60 or 66) and the other reinforcement bedding layer (68 or 62) is applied discontinuously over its inner neighboring layer (66 or 60).

18. An optical communication cable having a longitudinal axis comprising:

a core comprising at least one light transmitting optical fiber;

an inner tubular jacket containing the core;

a reinforcement bedding layer;

a layer of reinforcing first strength members helically wrapped about the reinforcement bedding to form an intimate surface interface;

a layer of reinforcing second strength members helically wrapped about the first strength members; and an outer jacket made of plastic extrudant and coupled with the first and second strength members;

where the first and second strength members are helically wrapped in opposite directions with predetermined lays such that under a tensile load each layer produces a substantially equal but oppositely directed torque with respect to the axis of the cable;

and where the bedding layer is made of a material which is capable of registering the first strength members as they are helically wrapped onto the bedding layer during cable manufacture to hold the first strength members in regular intervals around the cable and which is substantially impervious to plastic extrudant and intimately interfaces with the strength members to form predetermined strength member surfaces (27) inaccessible to the outer-jacket plastic extrudant during cable manufacture, whereupon helical wrapping of the first strength members onto the bedding layer during cable manufacture, the bedding layer registers the first strength members and renders the predetermined strength member surfaces sufficiently inaccessible to the outer-jacket plastic extrudant to prevent strength member encapsulation by plastic extrudant of the strength member lengths containing the predetermined strength member surfaces.

* * * * *